Patented July 7, 1942

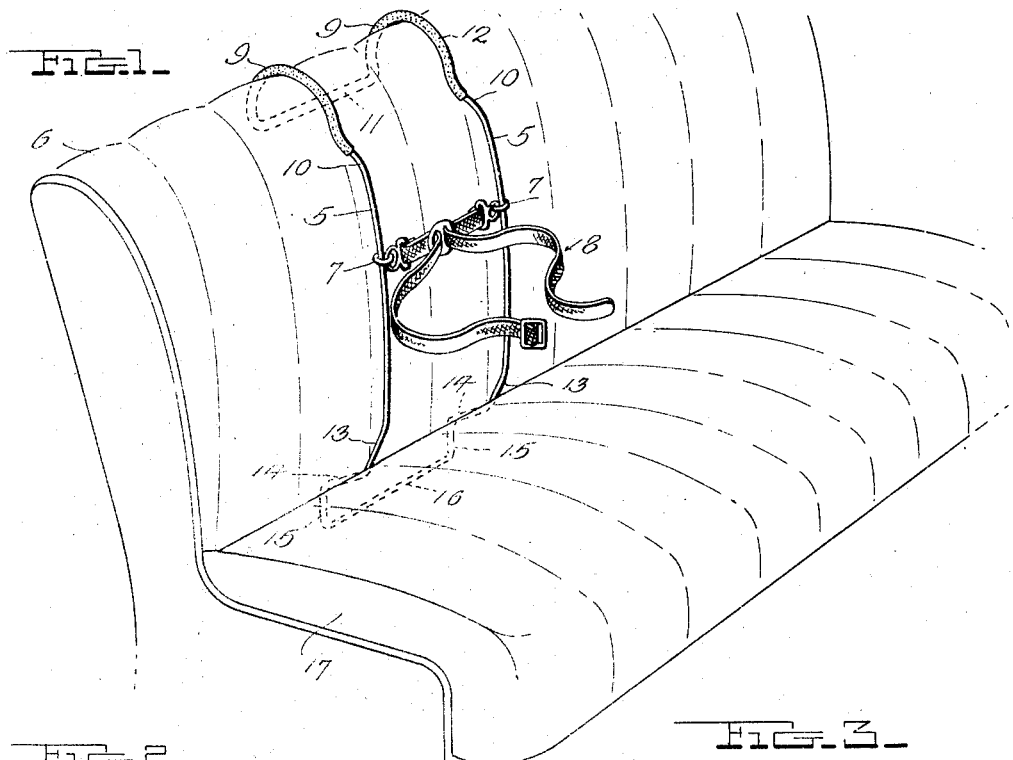
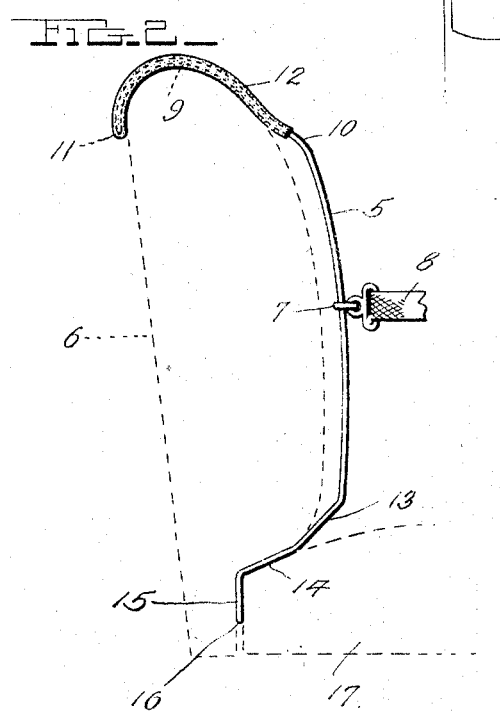
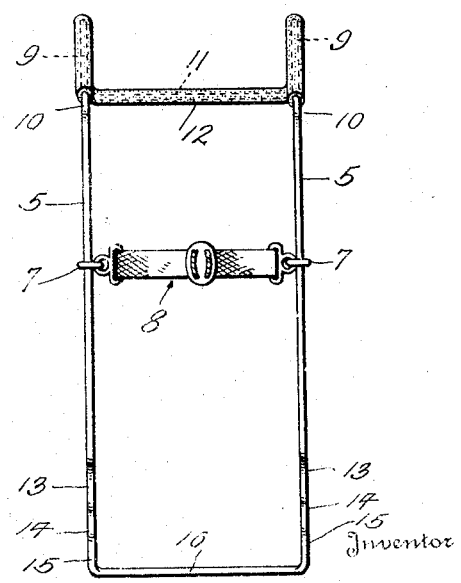

2,288,692

UNITED STATES PATENT OFFICE 2,288,692

AUTO BABY HOLDER

Ray R. Fearson, Arlington, Va.

Application April 5, 1941, Serial No. 387,087

5 Claims. (Cl. 155—189)

The invention aims to provide a simple inexpensive and effective device for safely holding a baby upon the seat of an automobile and permitting the child to either stand or sit or lie down, as desired, with no danger of the child being thrown forwardly from the seat when the brakes are suddenly applied and with no danger of throwing him sidewise off balance when turning corners.

With the foregoing in view, the invention resides in the novel subject matter hereinafter described and claimed, description being accomplished by reference to the accompanying drawing.

Figure 1 is a perspective view showing the device attached to the back of an automobile seat.

Figure 2 is a side elevation, partly broken away, the relation of the device with the seat back and seat cushion being shown by illustrating said back and cushion in dotted lines.

Figure 3 is a front elevation of the device partly broken away and in section.

A preferred construction has been illustrated and will be rather specifically decribed, with the understanding, however, that within the scope of the invention as claimed, variations may be made, both as to structure and materials.

Two vertical metal rods 5 are provided of substantially rigid, though somewhat resilient nature, said rods being intended to occupy positions in forwardly spaced relation with a seat back 6 and serving as vertical guide tracks for appropriate guides 7 by means of which any appropriate baby harness 8 may be connected with said rods.

The upper end portions of the rods 5 are bent to provide rearwardly and downwardly extending hooks 9 to embrace the upper edge of the seat back 6, and the rod portions 10 where the major parts of the rods join the hooks 9, are preferably curved forwardly and downwardly from the lower front portions of said hooks to space the upper ends of the track-forming portions of the rods forwardly from the seat back 6 to permit free sliding of the guides 7 along said track-forming portions of said rods. In the present showing, a horizontal spacing rod 11 extends between the rear extremities of the hooks 9 and is secured to them, and it is preferable to cover this rod and the hooks with rubber tubing or the like 12 to prevent injury to the seat back upholstery.

The lower portions of the rods 5 are rearwardly declined as shown at 13 and are then extended rearwardly at 14, and at the rear ends of the portions 14, the rods are bent vertically down to provide stops 15. The lower ends of these stops, in the present disclosure, are rigidly connected with each other by a horizontal spacing rod 16, and it will be obvious that all of the rod portions so far described, may well be bent from a single rod or heavy wire with its ends welded or otherwise suitably secured together.

The portions 14 extend between the lower edge of the seat back 6 and the seat cushion 17 and abut said lower edge of said seat back, and the stop portions 15 abut the rear edge of the seat cushion 17. Thus, any forward strain on the track-forming portions of the rods cannot disconnect the lower end of the device from the seat. Furthermore, as the portions 14 hold the lower ends of the rods against moving upwardly when forward strain is placed on the track-forming portions of the rods, the forward springing of said rods permitted by their inherent resiliency, tends to pull the hooks 9 downwardly into still tighter engagement with the seat back, thus securely anchoring the entire frame structure even when the child's harness severely pulls forwardly upon the rods when suddenly applying the car brakes. Moreover, the anchorage is such that the frame is securely held in position when the child is caused to sway sidewise in one direction or another when rounding curves or corners. The rod portions 13 at all times abut the lower front portion of the seat back 6 and thus space the super-jacent portions of the rods forwardly from said seat back, and as the hooks 9 space the subjacent portions of said rods forwardly from said seat back, the guides 7 may freely slide upon the track-forming portions of the rods to permit the child to stand or sit, at will, and the construction not only permits this free sliding of the guides 7 but prevents them from wearing the upholstery of the seat back.

From the foregoing, taken in connection with the accompanying drawing, it will be seen that novel and advantageous provision has been made for carrying out the object of the invention, and attention is again invited to the possibility of making variations over the specific structure herein disclosed. Such variations, of course, include not only structural changes, but changes in size and proportion to fit different cars, and use of one material or another, as desired.

I claim:

1. A baby holder for attachment to an automobile seat back and cushion, comprising two substantially rigid vertical tracks in substantially fixed spaced relation with each other, hook-shaped means at the upper ends of the tracks to take over the top of a seat back and anchor the upper portions of the tracks, forwardly extending means connecting said upper ends of said tracks with said hook-shaped means for holding the upper portions of said tracks in forwardly spaced relation to the seat back, stop means at the lower ends of the tracks to extend between the rear of the seat cushion and the seat back to hold the lower end of the tracks against accidental forward movement, additional forwardly extending means connecting said lower ends of said tracks with said stop means for holding the lower portions of said tracks in spaced relation to the front of the seat back, said additional forwardly extending means having a portion to engage with the lower edge of the seat back where it overlies the seat cushion to prevent accidental upward movement of the tracks, spacing means holding said tracks in said substantially fixed spaced relation with each other, and a baby harness having guides freely slidable along said tracks.

2. An auto baby holder comprising two spaced vertical rods to be positioned in front of a seat back, said rods having rearwardly and downwardly directed hooks at their upper ends to embrace the upper edge of the seat back and said hooks having forwardly directed portions to space the subjacent portions of the rods forwardly from said seat back, the lower ends of said rods being provided with rearwardly projecting portions to extend between the lower edge of the seat back and the seat cushion to hold the lower ends of said rods against accidental upward movement, parts of said rearwardly projecting portions being positioned to abut the lower front portion of the seat back to space the superjacent portions of the rods forwardly from said seat back, said rearwardly projecting portions being provided with stop portions to hold the lower ends of the rods against the rear of the seat to prevent accidental forward movement, spacing means holding said rods in spaced relation with each other, and a baby harness having guides freely slidable along said rods.

3. An auto baby holder comprising two spaced vertical rods to be positioned in front of a seat back, said rods having rearwardly and downwardly directed hooks at their upper ends to embrace the upper edge of the seat back and said hooks having forwardly directed portions to space the subjacent portions of the rods forwardly from said seat back, the lower ends of said rods being provided with rearwardly projecting portions to extend between the lower edge of the seat back and the seat cushion to hold the lower ends of said rods against accidental upward movement, parts of said rearwardly projecting portions being positioned to abut the lower front portion of the seat back to space the superjacent portions of the rods forwardly from said seat back, said rearwardly projecting portions being provided with downwardly projecting stop portions to abut the rear edge of the seat cushion and hold the lower ends of the rods against accidental forward movement, spacing means holding said rods in spaced relation with each other, and a baby harness having guides freely slidable along said rods.

4. A structure as specified in claim 2; said spacing means consisting of an upper rod connecting said hooks and a lower rod connecting lower portions of said rods.

5. A structure as specified in claim 3; said spacing means consisting of an upper rod connecting said hooks and a lower rod connecting said downwardly projecting stop portions.

RAY R. FEARSON.